United States Patent [19]

Deprez

[11] 4,215,959
[45] Aug. 5, 1980

[54] DRIVE TRAIN FOR GEAR MANUFACTURING MACHINE

[75] Inventor: Thomas A. Deprez, Rochester, N.Y.

[73] Assignee: The Gleason Works, Rochester, N.Y.

[21] Appl. No.: 929,600

[22] Filed: Jul. 31, 1978

[51] Int. Cl.² ............................. B23F 5/20; B23F 5/28
[52] U.S. Cl. .................................. 409/10; 51/95 GH; 51/105 HB; 409/11; 409/59; 409/61
[58] Field of Search .................. 409/1, 10, 11, 38, 59, 409/61, 12, 26, 51; 51/95 GH, 105 HB

[56] References Cited

U.S. PATENT DOCUMENTS

| | | | |
|---|---|---|---|
| 1,409,766 | 3/1922 | Perkins et al. | 409/59 |
| 1,468,393 | 9/1923 | Perkins et al. | 409/61 |
| 1,469,602 | 10/1923 | Perkins et al. | 409/10 |
| 1,503,996 | 8/1924 | Perkins et al. | 409/38 |
| 1,712,256 | 5/1929 | Colman | 409/6 |
| 1,737,217 | 11/1929 | Colman | 409/41 |
| 2,270,741 | 1/1942 | Rovick | 409/46 |
| 2,475,690 | 7/1949 | Bonnafe | 409/10 |
| 2,624,243 | 1/1953 | Hedberg et al. | 409/199 |
| 2,692,537 | 10/1954 | Gleason et al. | 409/10 |
| 2,749,804 | 6/1956 | Daout | 409/10 |
| 2,751,823 | 6/1956 | Freter | 409/256 |
| 2,838,980 | 6/1958 | Babcock | 409/262 |
| 3,587,385 | 6/1971 | Orend | 409/232 |
| 3,859,893 | 1/1975 | Hodgson | 409/11 |
| 3,971,293 | 7/1976 | Hunkeler | 409/5 |

FOREIGN PATENT DOCUMENTS 345611 12/1921 Fed. Rep. of Germany .
2413023 9/1976 Fed. Rep. of Germany .

OTHER PUBLICATIONS

Oswald Forst Brochure, "Vertical External Broaching Machines".
Oswald Forst Brochure, "RKW".

Primary Examiner—Z. R. Bilinsky
Attorney, Agent, or Firm—Ralph E. Harper; Morton A. Polster

[57] ABSTRACT

A gear manufacturing machine which includes an endless chain for carrying a series of stock removing tools is provided with a versatile drive train system which can be adjusted for different methods of gear manufacture. The drive train system includes coupling components which can be engaged and disengaged for connecting or disconnecting certain portions of the drive train from parts of the machine. With this arrangement, a single machine can be utilized for carrying out roll generating or hobbing operations with one or more workpieces.

6 Claims, 12 Drawing Figures

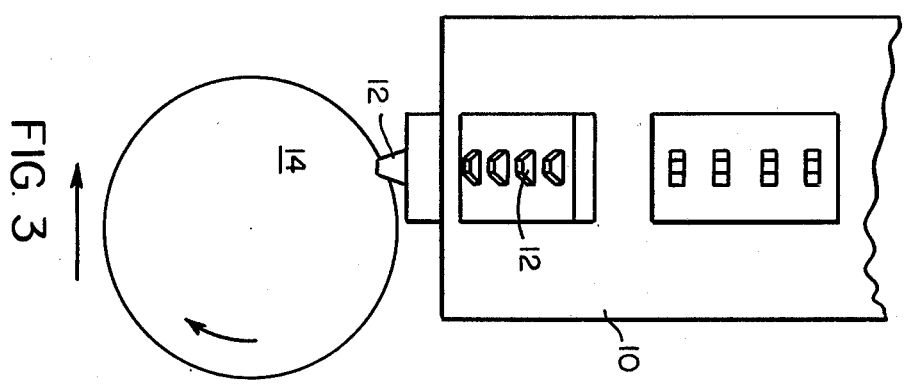
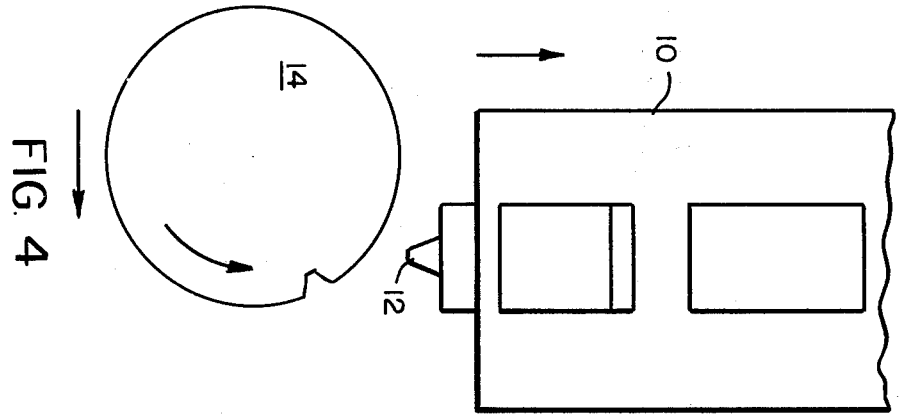
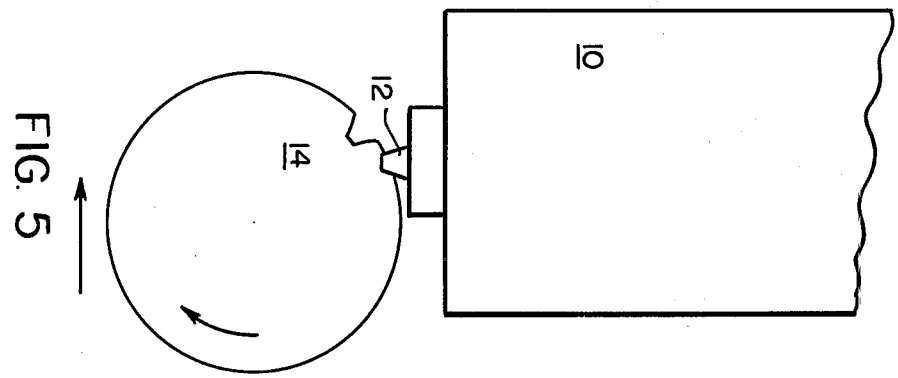

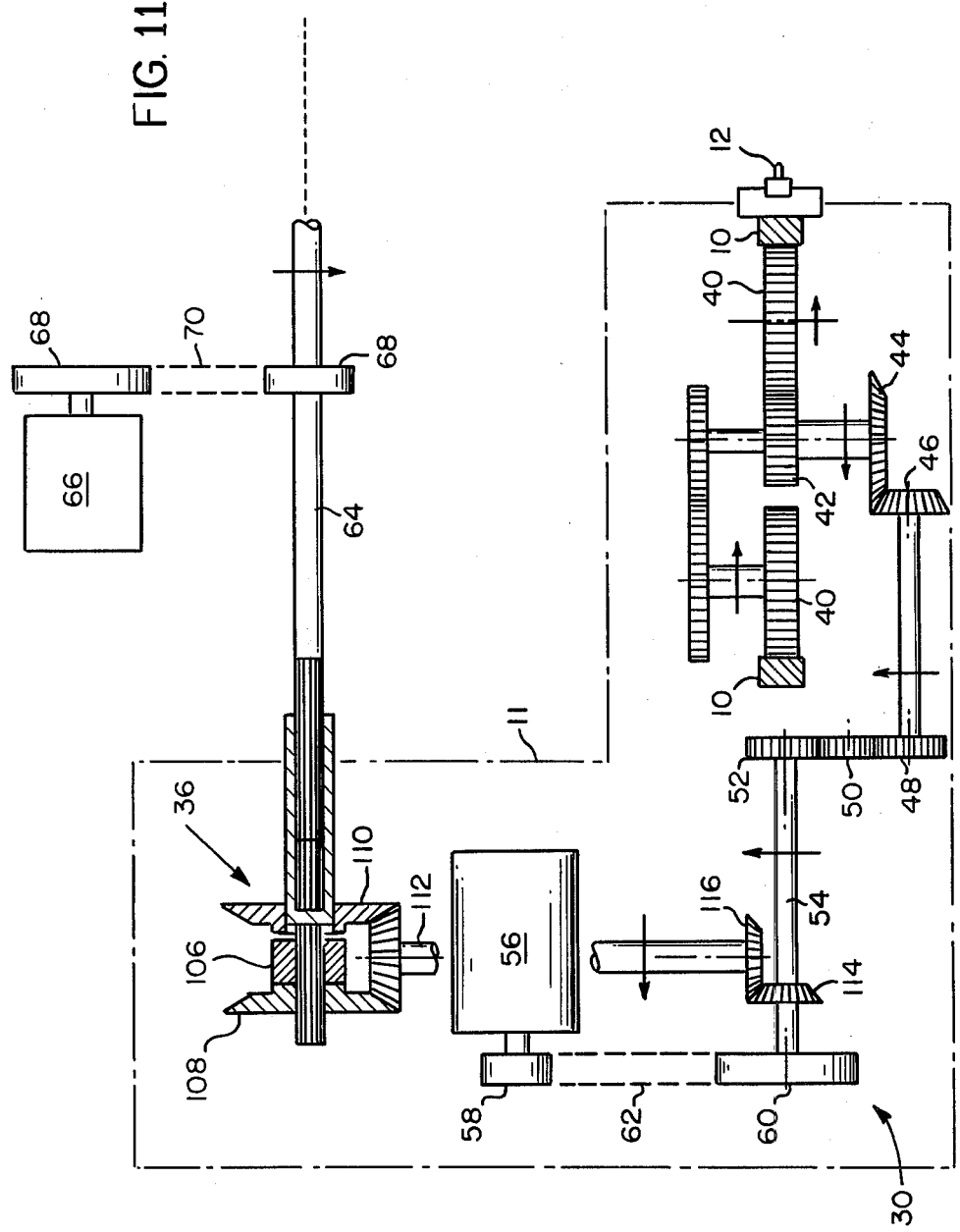

DRIVE TRAIN FOR GEAR MANUFACTURING MACHINE

BACKGROUND AND BRIEF DESCRIPTION OF THE INVENTION

It is known in the art of broaching to carry a series of work forming tools on an endless chain which can be driven so as to bring the tools into successive engagement with one or more workpieces. In addition, prior patents have disclosed the use of this type of machinery for forming spur and helical gears, although the applicant herein is unaware of any commercially successful gear forming machine which utilizes a chain for carrying tools for the manufacture of such precision products as gears.

Separate patents have disclosed separate arrangements for designing and assembling machinery for manufacturing gears. It is known, for example, from U.S. Pat. No. 1,469,602 to provide for a spiral arrangement of cutting tools about the working face of an endless chain means so that gear teeth can be formed in a workpiece by rotating the workpiece as the chain is rotated in a timed, working engagement with the workpiece. In this type of process individual tools remove stock from the workpiece as the workpiece rotates, and this process is continued until all of the cutting tools have passed through all of the tooth slots of the workpiece to develop a complete tooth profile. This type of process will be referred to herein as a hobbing process. Separately, it is known from U.S. Pat. Nos. 1,468,393; 2,475,690; and 2,749,804, for example, to provide for multiple rows of gear cutting tools arranged in parallel paths across the face of an endless chain for contacting a workpiece as the workpiece is rolled (or translated) relative to the working face of the chain. This type of operation will be referred to herein as a roll generating process.

There are different job applications where it may be desirable to use either the hobbing method or roll generating method (or variations thereof) for meeting specific production or quality requirements for the job. For example, the hobbing type of process offers higher production rates and is suitable for long production runs of the type that might be expected for fine pitch helical gears used in automotive applications. The generating process is slower but offers lower cost of tooling and versatility for jobbing type work or for manufacture of coarse pitch spur gears. These needs could be satisfied by utilizing separate machines for separate jobs, but obviously, such an approach involves a major investment in different types of machinery capable of carrying out the different manufacturing processes described above. In contrast, the present invention provides for a very versatile single machine which can be adjusted and set up to accommodate different processing requirements. A major feature of the machine of the present invention is its special drive train system which includes easily connected and disconnected components for effectively altering the operation of the machine from one type of cutting process to another.

According to a preferred embodiment of the invention, a gear manufacturing apparatus of the type having a series of stock removing tools carried on a drive endless chain is provided with a first drive train for driving the endless chain and a first (or main) drive motor operatively connected to the first drive train for imparting controlled driving motion to the endless chain. In addition, there is a second drive train for imparting a controlled rotating motion to the workpiece while the workpiece is presented to the stock removing tools carried by the endless chain. The second drive train can be selectively connected or disconnected to the first drive train to provide for two separate modes of operation for the machine.

In a first mode, the second drive train is connected to the first drive train, and this results in a timed relationship between the speed of movement of the stock removing tools relative to the speed of rotation of the workpiece. This mode is used for hobbing operations of the machine.

In a second mode, the second drive train is disconnected from the first drive train and is connected to a second drive motor for independently controlling the workpiece relative to movement of the stock removing tools. In this mode, an indexing system is operatively associated with the second drive train for providing periodic rotations of the workpiece while it is being formed into a gear. In this respect the second drive train is substantially identical to a generating drive train used in certain bevel gear cutting machines manufactured by The Gleason Works (see U.S. Pat. No. 3,971,293). Traversing means are also provided for translating the workpiece and the cutting tools relative to each other when the machine is set up to operate in this second mode. This second mode is used for generating operations of the machine. An improved generating method involves the use of a single row of tools on the endless chain for forming one, precisely controlled, tooth slot at a time in an indexing workpiece. This method is similar to known methods for forming single tooth slots in bevel gears, but has not, as far as is known, been used with an endless chain apparatus for forming spur and helical gears.

These and other features and advantages of the invention will become apparent in a more detailed discussion which follows. In that discussion reference will be made to the accompanying drawings as briefly described below.

BRIEF DESCRIPTION OF DRAWINGS

FIG. 3 is a schematic illustration of a forming process in which a single row of tools is arranged about the working surface of an endless chain to generate a single tooth slot in a workpiece as the workpiece is rotated and translated relative to the endless chain;

FIG. 4 is a schematic illustration of the process shown in FIG. 3, showing an indexing step in which the endless chain is withdrawn relative to the workpiece while the workpiece is traversed back to a starting position for roll generating a subsequent tooth slot;

FIG. 5 is a continuation of the process shown in FIGS. 3 and 4 and illustrates a re-engagement of the tools and a workpiece for forming a second tooth slot in the workpiece;

FIG. 11 illustrates a portion of a drive train layout for the apparatus shown in FIGS. 1 and 2 for carrying out either a hobbing or a generating type of process.

DETAILED DISCUSSION

Figure 1:
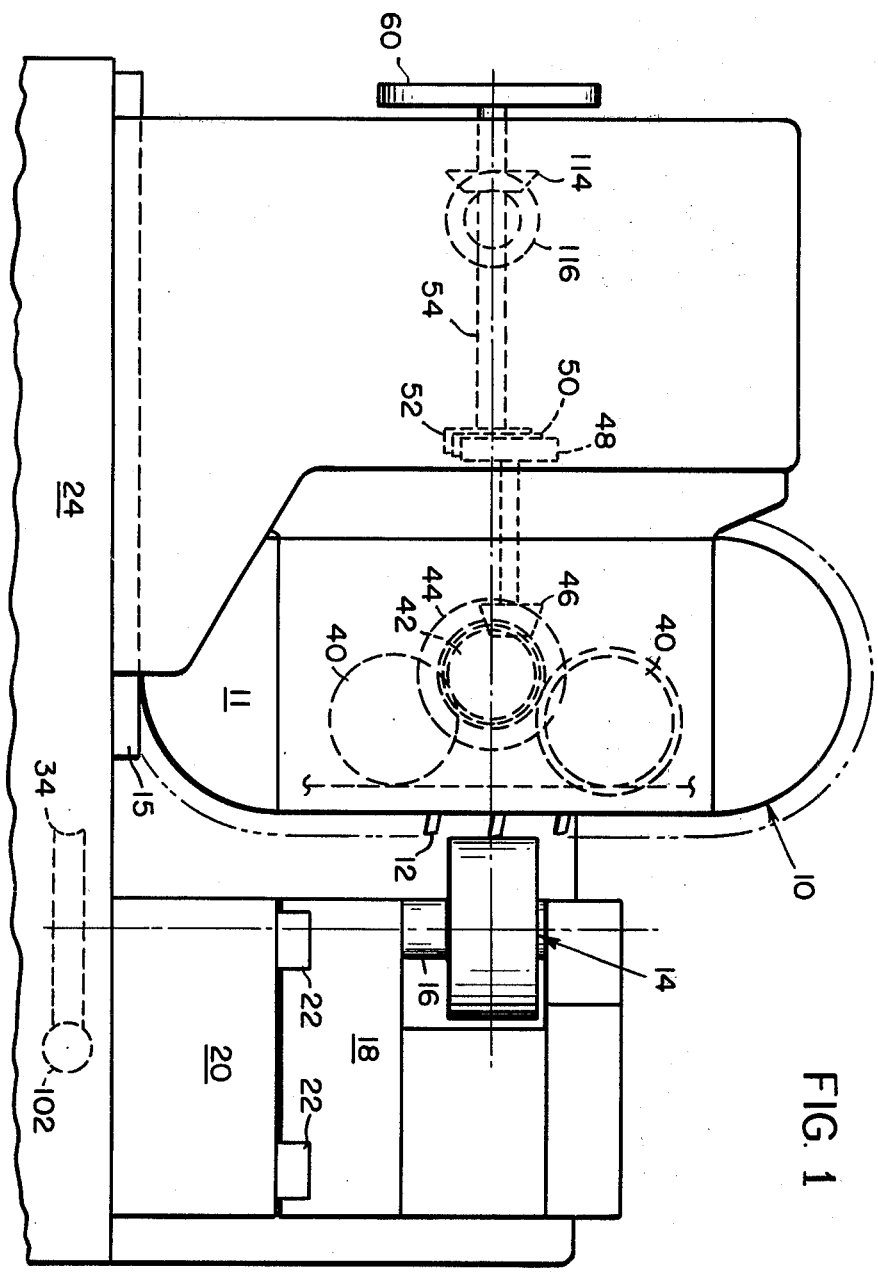
FIG. 1 is a side elevational view of the type of machine contemplated by the present invention as arranged to form tooth profiles on a workpiece presented to the machine.
Figure 2:
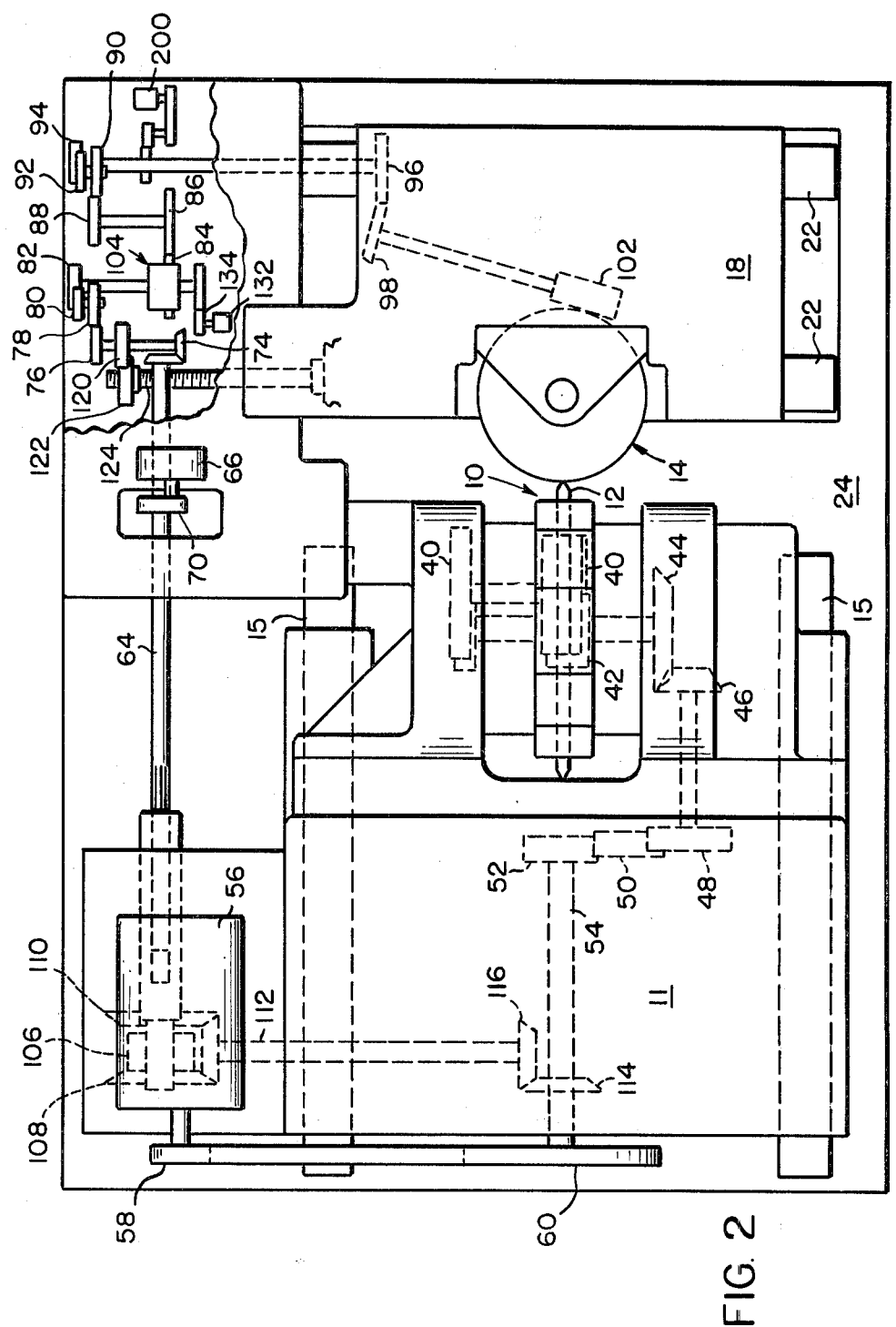
FIG. 2 is a top plan view of the machine in FIG. 1.

FIGS. 1 and 2 illustrate the type of gear manufacturing machine which includes the improved drive train of the present invention. Machines of this type typically include a driven endless chain 10 made up of a series of connected links for carrying a series of stock removing tools 12. The stock removing tools 12 may be in the form of cutting or grinding tools and may be arranged in one or more rows around the entire circumference of the endless chain 10. FIG. 1 shows the endless chain mounted in a vertical orientation in a housing 11 for being advanced toward and away from one or more workpieces 14 (workpieces may be manufactured one at a time or may be stacked and manufactured in multiple numbers) on ways 15, but other orientations of the endless chain are possible. At the work station end of the machine, the workpieces 14 are removably mounted on a spindle 16 supported in a housing 18. The housing 18 is carried on a base 20 and 24 and is mounted on ways 22 for providing a relative translating motion between the workpiece 14 and the endless chain 10. All working components are carried on a common base 24 which contains many of the drive train components for the operation of the machine. Details of the machine itself may vary widely in accordance with known design features for such machines. Loading and unloading devices may be provided for the movement of workpieces into and out of the work station area, and it would be possible to provide for translation of the endless chain itself relative to a fixed position of workpieces, if desired.

FIGS. 3–10 schematically illustrate gear manufacturing processes which can be carried out with a machine of the general type shown in FIGS. 1 and 2.

FIGS. 3–5 illustrate steps in a roll generating process in which a single row of tools 12 are arranged about the circumference of chain 10 for forming a single tooth slot at a time in a rotating workpiece 14. As shown in FIG. 3, the chain 10 and its series of tools 12 are moved to a full depth position for forming a tooth slot in the workpiece 14 as the workpiece 14 is translated (from right to left in the FIG. 3 view) past the working face of the endless chain 10. In addition, the workpiece 14 is rotated in the direction indicated, and this results in a rolling engagement of the workpiece with the cutting tools on the endless chain 10. At the end of the first translating movement of the workpiece in engagement with the cutting tools, the chain 10 and the workpiece 14 will be in the relative positions shown in FIG. 4.

From the FIG. 4 position, the endless chain 10 is withdrawn out of the path of travel of the workpiece 14, and the workpiece 14 is translated back (from left to right in the FIG. 4 view) to a starting position for forming a second tooth slot. In addition, the workpiece is indexed to a position which offsets the first tooth slot relative to the cutting tools by a precise amount which establishes the position of a second tooth slot. Formation of a second tooth slot is illustrated in FIG. 5. The use of a single row of tools on an endless chain for generating a single tooth slot at a time offers certain advantages over prior art processes which have used multiple rows of tools or which have not "generated" the profile of the tooth slot. One advantage is that forces on the machine are exactly the same for every tooth slot being formed and this assures greater precision of manufacture for all tooth slots. In addition, it is possible to modify the profile of a single tooth, if desired, through appropriate machine adjustments while the tooth slot is being formed. Hobbing processes and non-generating processes do not offer these advantages.

With the roll generating process shown in FIGS. 3–5, it is necessary to provide for a number of machine movements: the chain 10 must be continuously driven to bring all of its tools into engagement with a workpiece, the workpiece must be mounted for rotation relative to the chain 10 (but the rotation does not need to be timed with driving of the chain 10), there must be provision for translating the workpiece back and forth relative to the tools carried by chain 10, and there must be provision for indexing the position of the workpiece.

Figure 8:
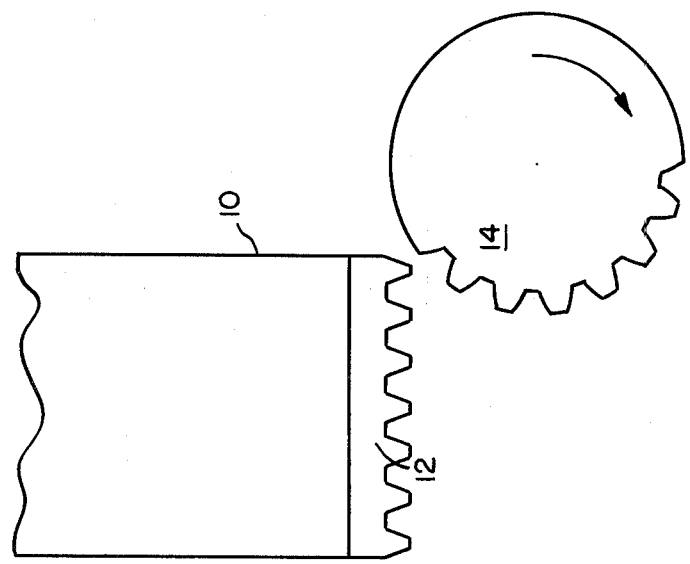
FIG. 8 illustrates a completion of the process started in FIG. 6 with the workpiece translated to a position out of contact with the endless chain.
Figure 7:
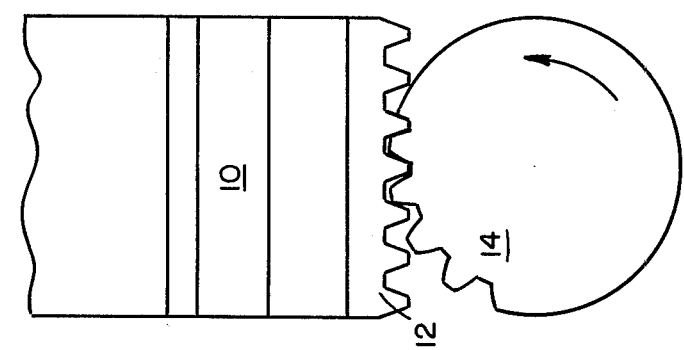
FIG. 7 is a continuation of the process of FIG. 6 showing the tools and workpiece at a midpoint of translation relative to one another.
Figure 6:
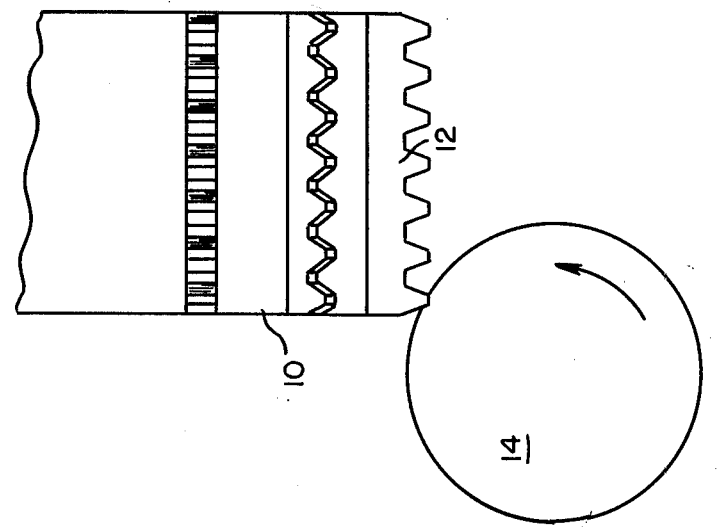
FIG. 6 is a schematic illustration showing a process of roll-generating more than a single tooth with each translation of the tools relative to a rotating workpiece.

FIGS. 6–8 represent a variation of the roll generating process illustrated in FIGS. 3–5, and this variation provides for generation of more than a single tooth at a time as a workpiece is translated across the working face of an endless chain. This is accomplished through a provision of multiple rows of tools 12 across the chain 10. It should be readily apparent from the sequence of views that seven tooth slots are formed by the seven rows of cutting tools 12 with each pass of the workpiece across the face of the endless chain 10. The machine motions for this process are the same as those described above for the single tooth process.

Figure 10:
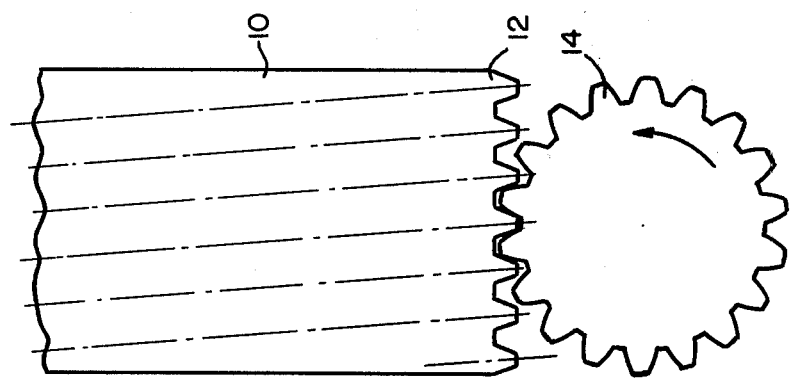
FIG. 10 illustrates a completion of the hobbing process started in FIG. 9.
Figure 9:
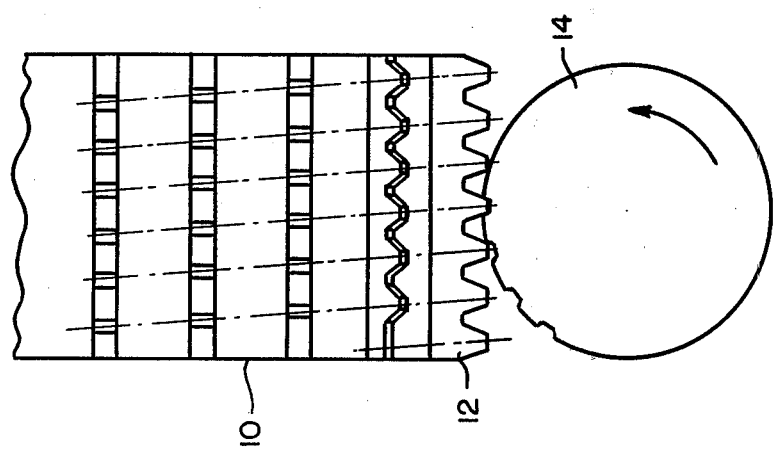
FIG. 9 schematically illustrates a hobbing type of process in which there is no relative translation between the workpiece and the plurality of tools carried by the endless chain, but the workpiece is rotated for a sufficient number of times to completely form all tooth profiles as the workpiece and work forming tools are brought into full depth engagement.

FIGS. 9 and 10 illustrate a hobbing type of process which involves significantly different machine motions than those described above with respect to the roll generating processes. In the hobbing type of process one or more rows of cutting tools 12 are spirally wound around the endless chain 10 so as to produce a lead (either right hand or left hand) in the rows of tools carried by the endless chain. In this type of process, the workpiece is rotated in a timed relationship with the movement of the cutting tools through the slot positions, and feeding of the tools and rotation of the workpiece continue until all tooth slots have been formed to full depth. FIG. 9 illustrates the beginning of the hobbing process wherein the cutting tools make an initial shallow cut about the entire circumference of the workpiece as the workpiece rotates relative to the cutting tools, and this process continues until full cutting depth is achieved, as shown in FIG. 10. Alternatively, a full plunge cut can be made at the beginning of the process, and teeth can be fully formed with one revolution of the workpiece after reaching full depth. Either way, the workpiece is advanced one pitch for each revolution of the endless chain (where the endless chain has a single lead of tooling). There is no relative translating of the workpiece and the tools, and there is no need to disengage the cutting tools from the workpiece once the cutting operation has been started. Thus, the hobbing process has the capability of higher production rates than the roll generating process described above, but tooling costs for the hobbing process are higher than those to be expected for the roll generating process. Machine motions which are required for the hobbing process include a timed relationship between the speed of rotation of the endless chain relative to the speed of rotation of the workpiece and a means for relatively advancing the cutting tools and the workpiece to bring about full depth engagement during the cutting process.

Figure 12:
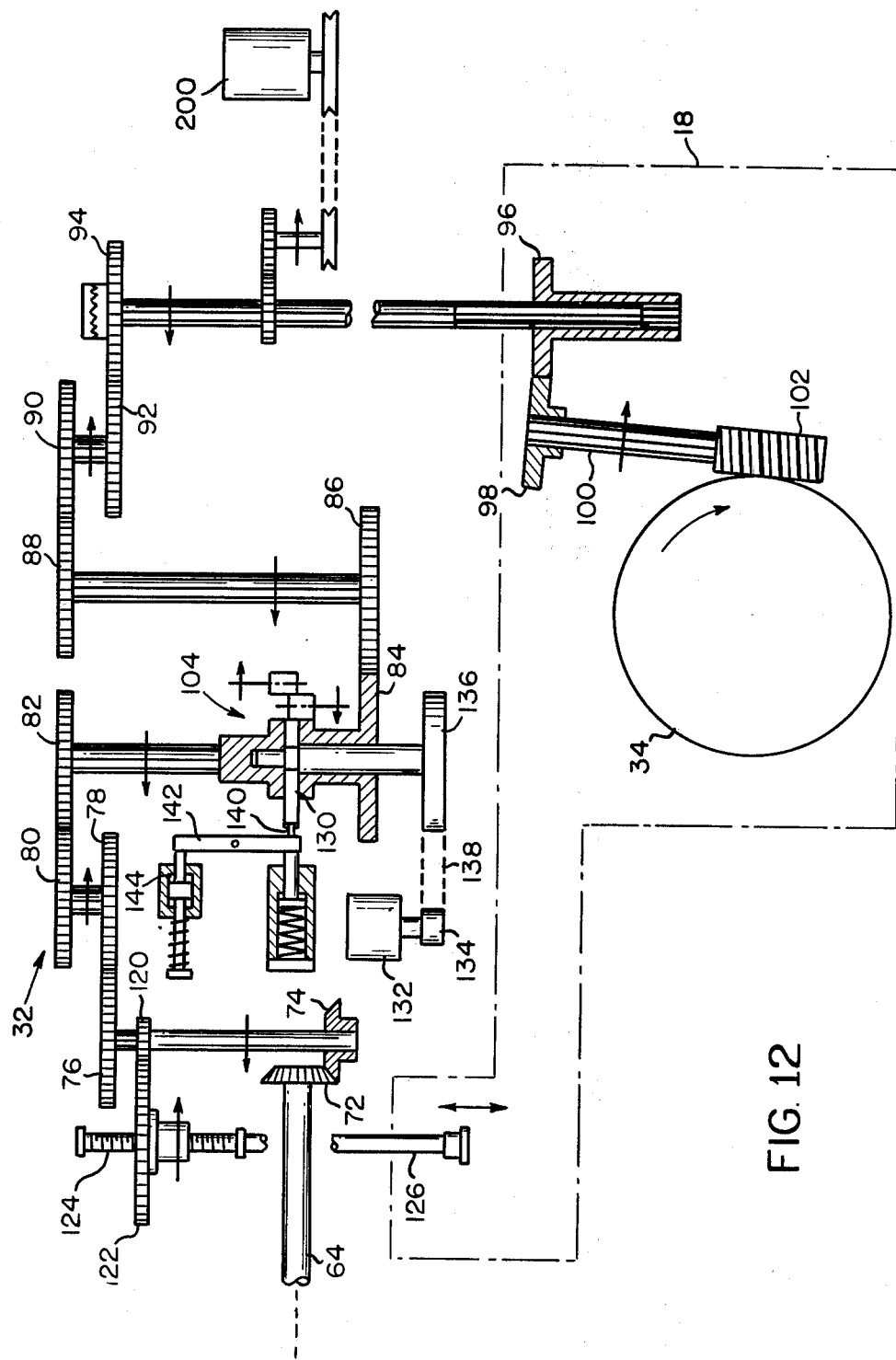
FIG. 12 illustrates another portion of the drive train layout shown in FIG. 11 (the two portions being connected with a common drive shaft 64).

One improvement of the present invention is to provide for a versatile drive train for a gear manufacturing machine capable of carrying out all of the processes discussed above. This is accomplished with the type of drive train layout illustrated in FIGS. 11 and 12. These two Figures together make up a single drive train layout when they are connected at the position of drive shaft 64. Such a layout includes a first drive train, generally indicated at 30 (FIG. 11), for driving the endless chain 10, and a second drive train, generally indicated at 32 (FIG. 12), for imparting a controlled rotating motion to a workpiece spindle 34 which carries one or more workpieces. A coupling means, generally indicated at 36 provides for selective connection or disconnection of the drive train 30 to the second drive train 32 to thereby provide for separate modes of operation of the machine. In a first mode of operation the second drive train 32 is connected to the first drive train 30 to produce a timed relationship between the speed of movement of the tools 12 relative to the speed of rotation of a workpiece carried on the work spindle gear 34. This mode of operation corresponds to the hobbing type of process described in FIGS. 9 and 10. A second mode of operation disconnects the first drive train 30 from the second drive train 32 so that the second drive train can be independently controlled in a way that will be discussed in greater detail below. This second mode of operation corresponds to the roll generating processes described in FIGS. 3–8.

The first drive train 30 includes drive gears 40 for engaging racks formed on the back sides of individual links making up the endless chain 10. The drive gears 40 are driven by a gear 42 which receives its driving movement from a series of gears 44, 46, 48, 50 and 52. The gear 52 is mounted on a shaft 54 which is driven from a first (or main) drive motor 56 which drives pulleys 58 and 60 through a belt 62. The pulley 60 is fixed on the same shaft 54 as is the gear 52. The drive motor may comprise a twenty-five horse power motor capable of operating at 1800 revolutions per minute, and the pulleys 58 and 60 are selected to provide desired speed of the endless chain 10 relative to the speed of the motor 56.

The second drive train 32 is driven either from the first drive train 30 (through the coupling means 36 and its output shaft 64 or from a second motor means 66 (FIG. 11) which can be selectively actuated to drive a pair of pulleys 68 through a drive belt 70. In either case, the output shaft 64 drives a series of gears which include gears 72, 74, a series of ratio change gears 76, 78, 80, and 82, followed by a further series of gears 84, 86, 88, 90, 92, 94, 96, and 98. The gear 98 rotates a shaft 100 which carries an angular worm gear 102 for engaging teeth formed on a gear 34 connected to the work spindle 16. An angular relationship (relative to the plane of the drawing for FIG. 12) of worm gear 102 to the work spindle 34 assures greater load bearing contact between the worm and the gear being driven by the worm. Interposed between gears 82 and 84 is a planetary differential 104 of known design for providing an optional indexing of the work spindle when the machine is set up for a roll generating process. However, for the hobbing process it is only required that there be a direct drive between gears 82 and 84, and the function of the planetary differential 104 is not needed.

When the machine is set up for a hobbing process, the coupling means 36 is actuated to engage a clutch member 106 with either of the pair of gears 108 and 110. The gears 108 and 110 are mounted on a common shaft and are simultaneously rotated by a drive shaft 112 receiving a driving moment from the shaft 54 (through gears 114 and 116) of the first drive train. Engagement of the clutch 106 with either gear 108 or 110 serves to connect the first drive train 30 with the output shaft 64, and the output shaft 64 is rotated in one direction or the other in accordance with the selection of either gear 108 or 110 for being coupled to shaft 64. For the hobbing process the second motor 66 is not required, and is adjusted to merely idle (or is disconnected) while the shaft 64 is driven by the main drive motor 56. From the shaft 64, driving moments are imparted to the work spindle gear 34 to achieve a timed relationship between the driving of the endless chain 10 and the driving of work. Gears 76, 78, 80, 82, 88, 90, 92, and 94 can be selected and changed to accommodate whatever process is being established for a given machine operation.

In order to set up the machine for a roll generating process, it is necessary to disconnect the second drive train 32 from the first drive train 30. This is done by moving the clutch 106 to a neutral position in which neither gear 108 nor gear 110 are engaged for imparting a driving moment to the shaft 64. Instead, the shaft 64 is driven by the second drive motor 66. Driving of the shaft 64 rotates the pair of gears 72 and 74 and all of the remaining gears previously identified. In addition, gears 120 and 122 (which may be considered a third drive train and which are inoperative when the machine is set up for a hobbing process) are rotated to operate a traversing means which includes a ball screw 124 and shaft 126 connected to a portion of the housing 18 supporting the work spindle 16. Rotation of the gear 122 serves to translate the work spindle housing 18 across the working face of the endless chain 10 so as to move the workpiece back and forth across the cutting zone as described in FIGS. 3–8. The second drive motor 66 is reversible so that the work spindle can be returned to a starting position after each translation across the face of the endless chain 10. In addition, the motor 66 can be controlled to operate at different speeds to thereby adjust to varying cutting loads during the formation of any given tooth slot or to provide for tooth profile adjustment. The traversing means is disconnected and not used for a hobbing set up of the machine.

As previously indicated, a planetary differential 104 is provided for imparting periodic indexing motions to the work spindle for roll generating processes. The differential is of a known type and construction and includes an index plate 130 for receiving periodic rotations from an index motor 132 which drives a pair of pulleys 134 and 136 through a belt 138 in accordance with a programmed operation of the machine. The index plate 130 is held in a locked position by a locking pawl 140 carried at the end of a lever 142 which is periodically actuated to an unlocked position by a hydraulic control system 144. When the index plate is held in a locked position, the second drive train serves to rotate the work spindle gear 34 as the work is translated past the cutting tools carried by the driven endless chain 10. Upon completion of one translation, the index plate is unlocked, and the index motor 132 rotates the plate and the remaining portion of the drive train to place the workpiece into a correct position for cutting a subsequent tooth slot to the one just manufactured. While this is taking place, the endless chain is withdrawn from any conflicting engagement with the workpiece as the workpiece is translated back to a starting position by a reversal of the drive motor 66. These machine features permit the use of the machine to carry out a single tooth generating process with a single row of tools carried by the endless chain. Although it is known to control the formation of each tooth slot during the manufacture of bevel gears, it is believed that no similar process has been offered with an endless chain machine for forming spur and helical gears. By limiting the process to a single tooth at a time it is possible to achieve greater tooth profile control and greater uniformity of all tooth slots. Of course, this process could be carried out with an endless chain machine having only a single drive train designed just for a roll generating and indexing operation.

Having described the structural and functional features of one embodiment of the invention, it can be appreciated that the principles of this invention can be carried out with equivalent structures and functions. For example, it is possible to traverse the work spindle housing with a separately controlled device rather than the ball screw arrangement 124 which is included in the second drive train described above. Also, it would be possible to translate the cutter housing rather than the work spindle housing. Many specific details of machine control have been omitted from the drawings and discussion because they are within the skill of persons familiar with the design and manufacture of machine tools. For example, it should be apparent that many electrical controls and circuits will be required to turn selected motors and components on and off at the right times. An antibacklash drive is shown at 200 in FIG. 12, and this is a well known system for machine tool drive trains. Means for moving the cutting tools (and endless chain) towards and away from a working engagement with a workpiece can include hydraulic rams or other well known devices for moving the housing 11 on its ways 15, and therefore, no attempt has been made to show such devices in the drawings. These and other changes, additions, and variations will be obvious to persons skilled in this art, and all such equivalent substitutions and additions are intended to be included within the scope of the invention as claimed below.

What is claimed is:

1. In gear manufacturing apparatus of the type in which a series of stock removing tools are carried on a driven endless chain means so that the tools can be brought into working engagement with one or more workpieces, the improvement in a drive train layout for such apparatus comprising a first drive train for driving the endless chain means a second drive train for imparting a rotating motion to workpieces about their axes of rotation as said workpieces are presented to stock removing tools carried by the endless chain means, a third drive train for imparting relative translating motion between the endless chain means and the workpieces, a main drive motor operatively connected to said first drive train for imparting controlled driving motion to the endless chain means, a reversible drive motor which can be selectively connected to or disconnected from said second and third drive trains, first coupling means for selectively (a) connecting said second drive train to said main drive motor for establishing a timed relationship between the driving of said stock removal tools carried by the endless chain means and the rotating of said workpieces, or (b) disconnecting said second drive train from said main drive motor so that the second drive train can be driven by said reversible drive motor independently of the driving of said first drive train by the main drive motor, and second coupling means for selectively coupling said second drive train to said third drive train to thereby impart a relative translating motion between said endless chain means and said workpieces.

2. The improvement of claim 1 and including: an indexing system which can be selectively actuated to impart a rotating motion to said workpieces, said indexing system being operatively associated with said second drive train so that the rotating motion of the indexing system can be applied to the rotating motion delivered by said second drive train.

3. The improvement of claim 2 wherein said indexing system includes an index plate which can be selectively locked and unlocked to control periodic indexing of said workpieces when said second drive train is being independently driven by said reversible drive motor.

4. The improvement of claim 1 wherein said first coupling means includes a pair of gears which can be rotated in opposite directions while being driven from said main drive motor, and including a clutch device for connecting an output shaft from said first coupling means to either one or neither one of said pair of gears to thereby provide for opposite directions of rotation, or no rotation, of said output shaft in response to operation of the main drive motor.

5. The improvement of claim 1 wherein said third drive train is operatively connected to supporting structures for said workpieces, whereby said third drive train can function to translate the workpieces relative to a fixed position of said endless chain means when said second drive train is connected to said third drive train.

6. In gear manufacturing apparatus of the type in which stock removing tools are carried on a driven endless chain so that the tools can be brought into working engagement with a workpiece, the improvement in a drive train arrangement for such apparatus characterized by a first drive train for driving the endless chain, a first drive motor operatively connected to said first drive train for imparting controlled driving motion to the endless chain, a second drive train for imparting a controlled rotating motion to the workpiece while the workpiece is presented to the stock removing tools of the endless chain, a second drive motor comprising a reversible motor which can be selectively connected to or disconnected from said second drive train, coupling means for selectively connecting or disconnecting said first and second drive trains to thereby provide for separate modes of operation of the machine that include (a) a first mode in which said second drive train is connected to said first drive train and said first drive motor to produce a timed relationship between the speed of movement of said stock removing tools relative to the speed of rotation of said workpiece, and (b) a second mode in which said second drive train is disconnected from said first drive train and is connected to said second drive motor for independently controlling the rotation of said workpiece relative to the movement of said stock removing tools, an indexing system operatively associated with said second drive train when said machine is operating in said second mode, to provide for periodic rotations of said workpiece, and traversing means for imparting relative translating motion between the workpiece and the endless chain when said machine is operating in said second mode, said traversing means comprising a third drive train operatively connected between said second drive motor and said workpiece when said machine is operating in said second mode.

* * * * *